UNITED STATES PATENT OFFICE.

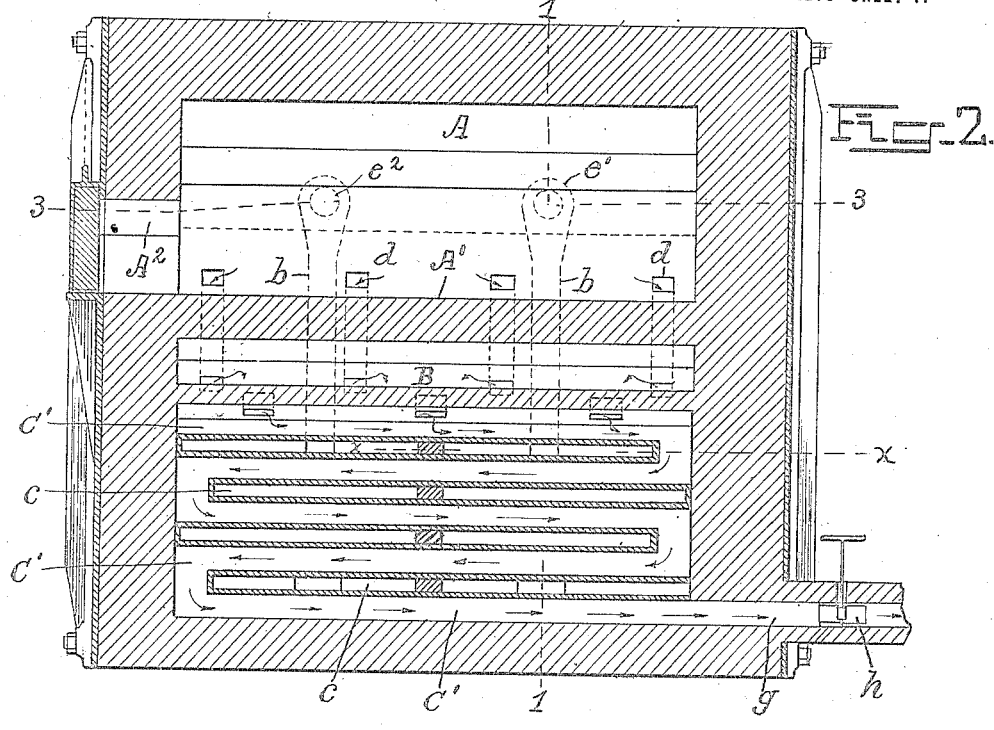
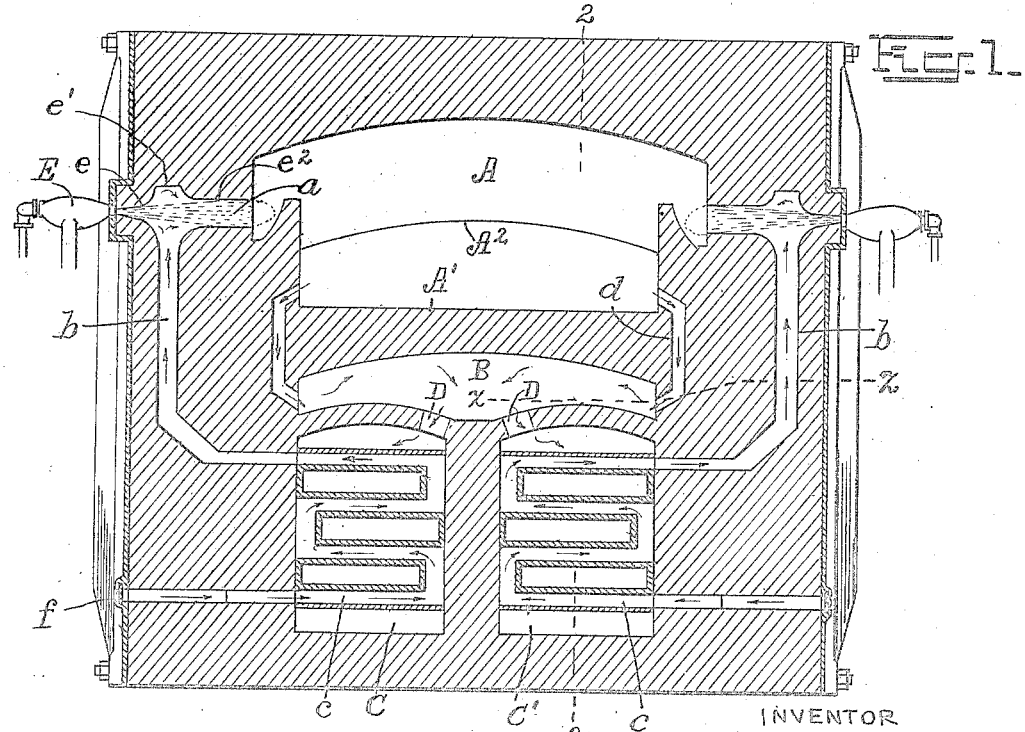

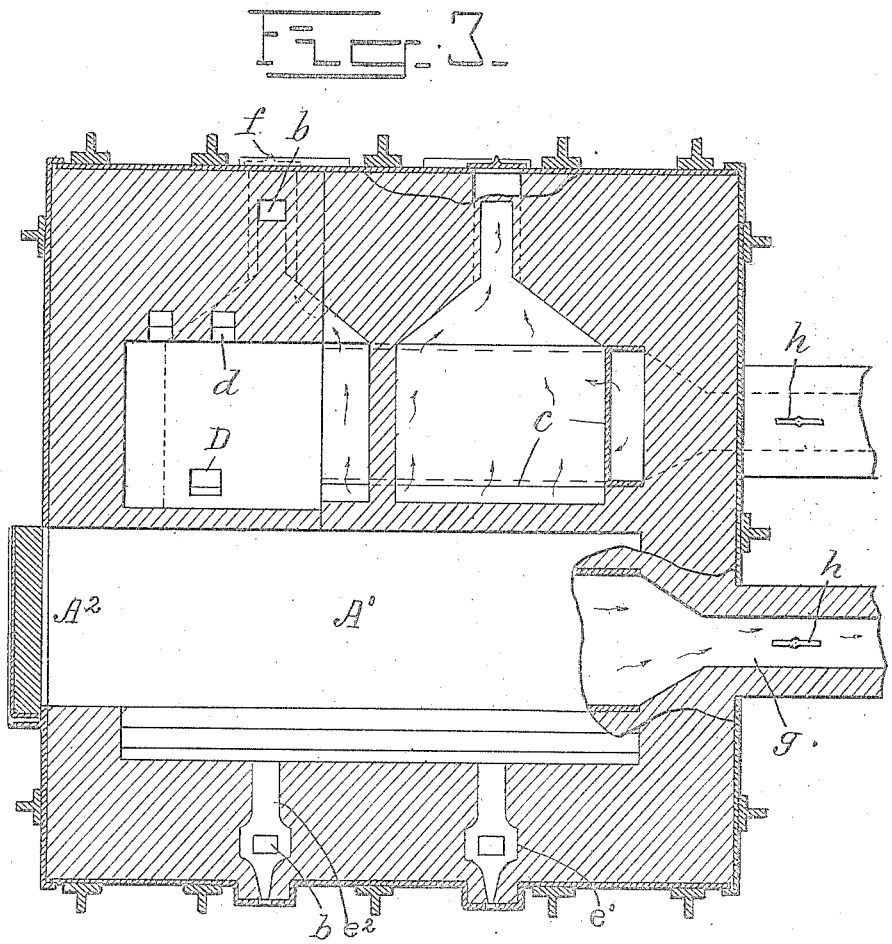

WALTER S. ROCKWELL, OF NEW YORK, N. Y., ASSIGNOR TO W. S. ROCKWELL COMPANY, OF NEW YORK, N. Y., A CORPORATION OF NEW JERSEY.

RECUPERATIVE FURNACE.

1,358,330.

Specification of Letters Patent.

Patented Nov. 9, 1920.

Application filed November 4, 1919. Serial No. 335,601.

*To all whom it may concern:*

Be it known that I, WALTER S. ROCKWELL, a citizen of the United States, residing at 300 West 106th street, New York, county of New York, and State of New York, have invented certain new and useful Improvements in Recuperative Furnaces, fully described and represented in the following specification and the accompanying drawings, forming a part of the same.

The present invention consists of a furnace having means to deliver a supply of air to burners fed with gaseous fuel, means to accelerate the mixture of the air and gas before and during combustion, means to heat the air by the waste gases when desired, and means to heat both the upper and lower sides of the furnace hearth, when a high temperature of the hearth is required.

A fuel burner of particular construction is preferably used, having a blast-inlet formed in a wall of the furnace, and expanded into a mixing-chamber within the said wall, and an induction passage extended from the mixing-chamber through the said wall into a heating-chamber where combustion is completed.

The air is heated, by extending an air-duct contiguous to the outlet-flue for the waste gases, and connecting such duct to the mixing-chamber of the burner mixed with the products delivered from the burner.

The lower side of the hearth is heated when required, by extending a sub-chamber beneath substantially the whole area of the hearth, and passing the waste gases through such sub-chamber when they first escape from the heating-chamber.

The improvements in the furnace are adapted for use with burners applied directly to the heating-chamber of a furnace, or to any chamber therein.

The term "furnace-chamber" is used herein to express any chamber to which the burner delivers the fuel for combustion.

The invention will be understood by reference to the annexed drawing, in which Figure 1 is a cross section of the furnace taken on line 1—1 in Fig. 2; and Fig. 2 is a vertical section on line 2—2 in Fig. 1. The lower half of Fig. 3 is a sectional plan at the level of the burner centers, with the hearth broken away at the right-hand end to the center line of the discharge vent. In the upper right-hand corner, Fig. 3 is a horizontal section on line $x$—$x$ in Fig. 2; and in the upper left-hand corner is a horizontal section on line $z$—$z$ in Fig. 1.

In the drawing, A designates the heating-chamber with hearth $A'$ and doorway $A^2$. B designates a sub-chamber extended below substantially the whole area of the hearth $A'$ to heat the same, and C, $C'$ are outlet-chambers for heating the air used in combustion. The waste gases pass from the heating-chamber into the sub-chamber through descending passages $d$ and from the sub-chamber into the outlet-chambers by openings D, which form part of the outer flue.

The extension of the sub-chamber below substantially the whole area of the hearth causes a great expansion of the heated gases which enter such chamber. Such expansion greatly retards the flow of the gases and thus retains them much longer in contact with the lower side of the hearth than is possible with any smaller area below the hearth.

This secures a far greater utilization of the heat in the gases, and heats the lower side of the hearth to substantially the same temperature as the upper side without any additional expense.

Burners E are shown applied to blast-inlets $e$ formed in the walls of the heating-chamber A, and an expanded mixing-chamber $e'$ is formed within the wall and connects with the blast-inlet $e$. A hot air-duct $b$ extends from each outlet-chamber C and $C'$ to at least one of the mixing chambers, to supply the air required for combustion.

A so-called induction-passage $e^2$ extends from the mixing-chamber through the inner side of the wall in line with the blast-inlet, which thus propels the gaseous fuel through the mixing-chamber and the induction-passage into the heating-chamber A.

The induction-passage, as shown at $e^2$ in Fig. 2, is of circular cross section, and the gaseous fuel being provided under pressure expands as it enters the mixing-chamber, and owing to the circular form of the induction-passage the blast entirely fills it in its movement to the heating-chamber, as indicated by the dots $a$ in Fig. 1, which show the movement of the fuel through the induction-passage.

This passage thus operates as an ejector in connection with the mixing-chamber to draw into the chamber and deliver to the heating-chamber a supply of air which is automatically regulated by the velocity and volume of the gaseous fuel moving through the induction-passage.

When properly proportioned, the induction-passage is filled by the blast or current of entering gases whether the volume of the blast is at the minimum or maximum required to maintain the desired condition in the furnace.

This filling of the induction-passage tends to resist the pressure of the gases in the heating-chamber, and to more or less vary the volume of induced heated air in proportion to the volume or velocity of the current injected into the mixing-chamber by the blast.

The circular form of the induction-passage is important, as the uniform expansion of the gases causes them to completely fill such passage and produce an ejector effect, which would not so effectively be produced if the passage were square or had angular corners.

Means are provided for controlling the flow of gaseous fuel to the burner, but the heated air supply is automatically controlled in the manner just described, so that an increased supply of fuel draws into the burner (by induction) an increased supply of air, while a diminished supply of fuel draws into the burner a correspondingly diminished supply of air. The proper combustion of the fuel is thus perfectly effected, whether its supply be greater or less.

The outlet-chamber intersects the outlet-flue between the sub-chamber and the outlet-damper; and the air-duct is disposed in the outlet-chamber contiguous to the spent gases, to be heated by the spent gases passing through the outlet-flue, and the air for combustion is thus heated without any consumption of fuel.

The inlet of the air-duct is extended to the atmosphere at the damper $f$, and its outlet is connected with the hot-air-duct $b$ which delivers the hot air into the mixing-chamber, where it is rapidly mixed with the gaseous fuel and ignited before it enters the heating-chamber A.

The sub-chamber B is also, without any consumption of fuel, heated to a high temperature by the passage of the burning gases directly to the sub-chamber through the descending passages $d$. The high temperature of the sub-chamber B would unfit it for use as a recuperative chamber, but the chambers C and C′ receive the waste gases after they have yielded up much of their heat, so as not to exert an injurious effect upon the air-duct $c$.

The combination of the burner-inlet (which is formed with a blast-passage $e$, mixing-chamber $e'$, and the induction-passage $e^2$) with the means for heating the air and leading it directly into the mixing-chamber without any expenditure of fuel, secures a high degree of efficiency in the generation of heat in the heating-chamber, and the utilization of such heat for heating the under side of the hearth and the air employed in combustion.

Separate outlet-chambers are shown to supply with hot air the burners at each side of the heating-chamber, but more or fewer of such outlet-chambers may be provided as preferred.

The air passing through the duct $c$ moves in an opposite direction to the spent gases traveling through the outlet-chamber to its outlet.

This is an advantageous construction, as it exposes the air constantly to an increasing temperature in the outlet-chambers, and thus secures a greater absorption of heat by the air. This feature is not however essential to the operation of the invention.

The most important feature of the invention from a commercial point of view, is the connection, with the heating-chamber, of the outlet-flue and air-duct to heat the air for combustion, and the provision of the burner-inlet with a blast-inlet, an expanded mixing-chamber connected to the air-duct; and a round induction-passage which operates to induce and control the supply of air to the burner.

I am aware that it is common to use the waste gases of a furnace to heat air to promote the combustion of the fuel, but I am not aware that the air thus heated has been supplied to any gases in combustion by such means as I have claimed.

It is also old to conduct the waste gases below the hearth of the heating-chamber, but I am not aware that a sub-chamber has ever been extended beneath the entire lower side of the hearth and the waste gases conducted through the same. This is a very advantageous arrangement, as it heats the lower side of the hearth almost as hot as the upper side, without any additional expense.

Having thus set forth the nature of the invention what is claimed herein is:

1. A furnace having a heating-chamber, a burner applied to the wall of the furnace and having a blast-inlet inserted in said wall with a mixing-chamber intersecting the blast-inlet within the wall, and an induction-passage extending from the mixing-chamber into the heating-chamber in line with the blast-inlet, an outlet-flue discharging the waste gases from the heating-chamber, and an air-duct connected with the atmosphere and extended contiguous to the outlet-flue and connected with the mixing-chamber independently of the burner, to supply the mixing-chamber with heated air, the whole arranged and operated substantially as herein set forth.

2. A furnace having a heating-chamber, a blast-inlet in a wall of the furnace, an expanded mixing-chamber intersecting the blast-inlet within the said wall, an induction-passage extended from the mixing-chamber in line with the blast-inlet into the heating-chamber, an outlet-flue connected with the heating-chamber to discharge the waste gases, and an air-duct connected with the atmosphere and extended contiguous to the outlet-flue into connection with the mixing-chamber, as and for the purpose set forth.

3. A mixing-chamber constructed according to claim 2 with the induction-passage formed of circular cross section to produce with the blast an ejector effect upon the air in the air-duct.

4. A furnace having a heating-chamber, a burner applied to the wall of the heating-chamber and having a blast-inlet in said wall, with an expanded mixing-chamber intersecting the blast-inlet within the said wall and an induction-passage of circular cross section extended from the mixing-chamber into the heating-chamber, an outlet-flue discharging the waste gases from the heating-chamber, a recuperative chamber intersecting the outlet-flue, with the spent gases passing through the same, and an air-duct connected with the atmosphere and extended through the recuperative-chamber into connection with the mixing-chamber of the burner to supply heated air thereto independently of the blast, the whole arranged and operated substantially as set forth.

5. A furnace having a heating-chamber with a sub-chamber beneath the entire lower side of its hearth and gas-passages leading the waste gases thereinto, an outlet-flue extended from the sub-chamber, a recuperative-chamber intersecting the said outlet-flue and having an air-duct therein heated by the spent gases, and a fuel-burner applied to the wall of the furnace-chamber and supplied with heated air from the said air-duct, whereby the waste gases operate consecutively to heat the under side of the hearth and to heat the air for the combustion of the fuel.

6. A heating-furnace having a heating-chamber with a sub-chamber beneath the entire lower side of its hearth and gas-passages leading the waste gases thereinto, an outlet-flue extended from the sub-chamber, a recuperative-chamber intersecting the said outlet-flue and having an air-duct heated by the spent gases, a blast-inlet in the wall of the metal-heating chamber, a mixing-chamber intersecting the blast-inlet within the said wall, an induction-passage extended from the mixing-chamber into the heating-chamber, and a connection from the said air-duct to the mixing-chamber to supply it with heated air, whereby the waste gases operate consecutively to heat the under side of the hearth and to heat the air for the combustion of the fuel.

In testimony whereof I have hereunto set my hand.

WALTER S. ROCKWELL.